No. 842,741. PATENTED JAN. 29, 1907.
C. F. YOUNG.
MACHINE FOR TREATING OIL CAKES.
APPLICATION FILED JAN. 31, 1906.

4 SHEETS—SHEET 3.

Witnesses
Edwin F. McKee
C. C. Hines

Inventor
C. F. Young
By Victor J. Evans
Attorney

No. 842,741. PATENTED JAN. 29, 1907.
C. F. YOUNG.
MACHINE FOR TREATING OIL CAKES.
APPLICATION FILED JAN. 31, 1906.
4 SHEETS—SHEET 4.

Witnesses
Edwin G. McKee
C. C. Hines.

Inventor
C. F. Young
By Victor J. Evans
Attorney

UNITED STATES PATENT OFFICE.

CHARLIE FRANK YOUNG, OF GINGHAMSBURG, OHIO.

MACHINE FOR TREATING OIL-CAKES.

No. 842,741. Specification of Letters Patent. Patented Jan. 29, 1907.

Application filed January 31, 1906. Serial No. 298,859.

*To all whom it may concern:*

Be it known that I, CHARLIE FRANK YOUNG, a citizen of the United States, residing at Ginghamsburg, in the county of Miami and State of Ohio, have invented new and useful Improvements in Machines for Treating Oil-Cakes, of which the following is a specification.

This invention relates to a machine for treating cotton-seed and like oil-cakes to remove portions thereof from which the oil has not been fully expressed.

The bulk of each oil-cake delivered from the oil-press is hard and has been freed from oil as much as possible; but the ends and edges have not been pressed to the same extent and are therefore comparatively soft and still contain a large percentage of oil. It is desirable to remove this soft marginal portion of the oil-cake, so that it may again be pressed for recovering the oil remaining therein without, however, removing much of the hard portion of the cake which has been practically freed from oil.

The object of my invention is to provide a machine which will automatically perform the operation of removing the soft marginal portions of oil-cakes in a speedy and efficient manner and without removing an undue amount of the body of the cake from which the oil has been fully extracted, thus avoiding waste and as far as possible the recompression of material which has already been compressed to the fullest extent.

With this and other objects in view the invention consists of the features of construction, combination, and arrangement of parts hereinafter fully described and claimed, reference being had to the accompanying drawings, in which—

Figure 1:
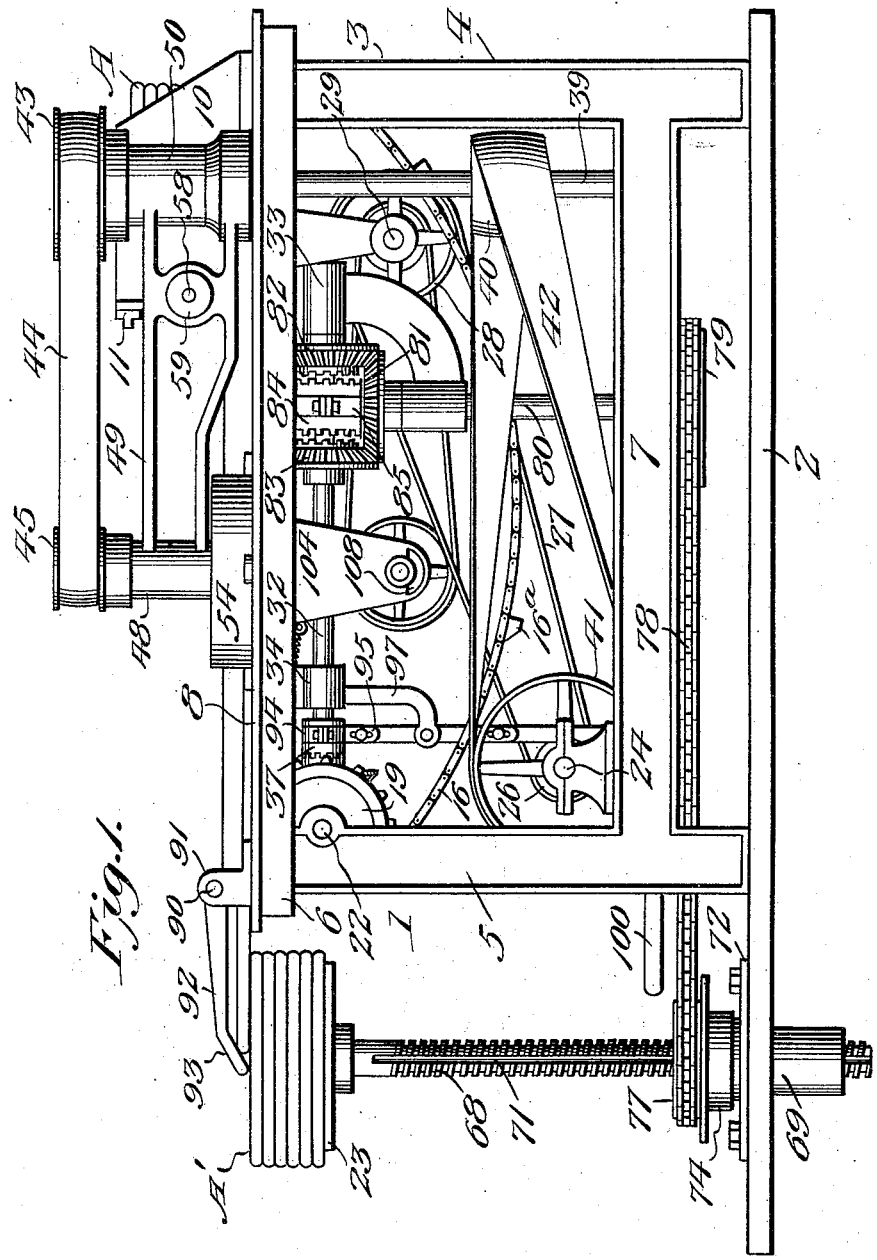
Figure 2:
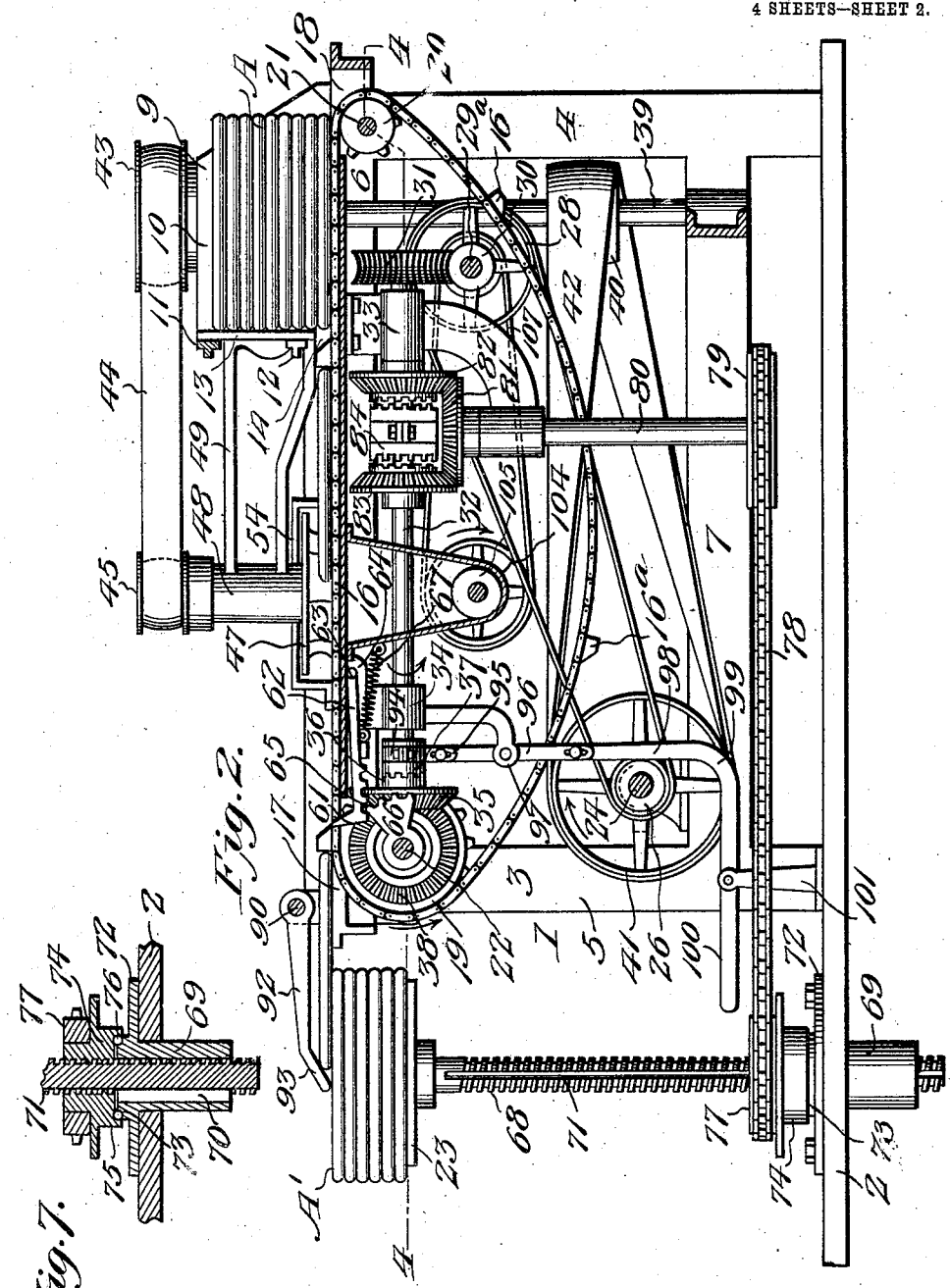
Figure 3:
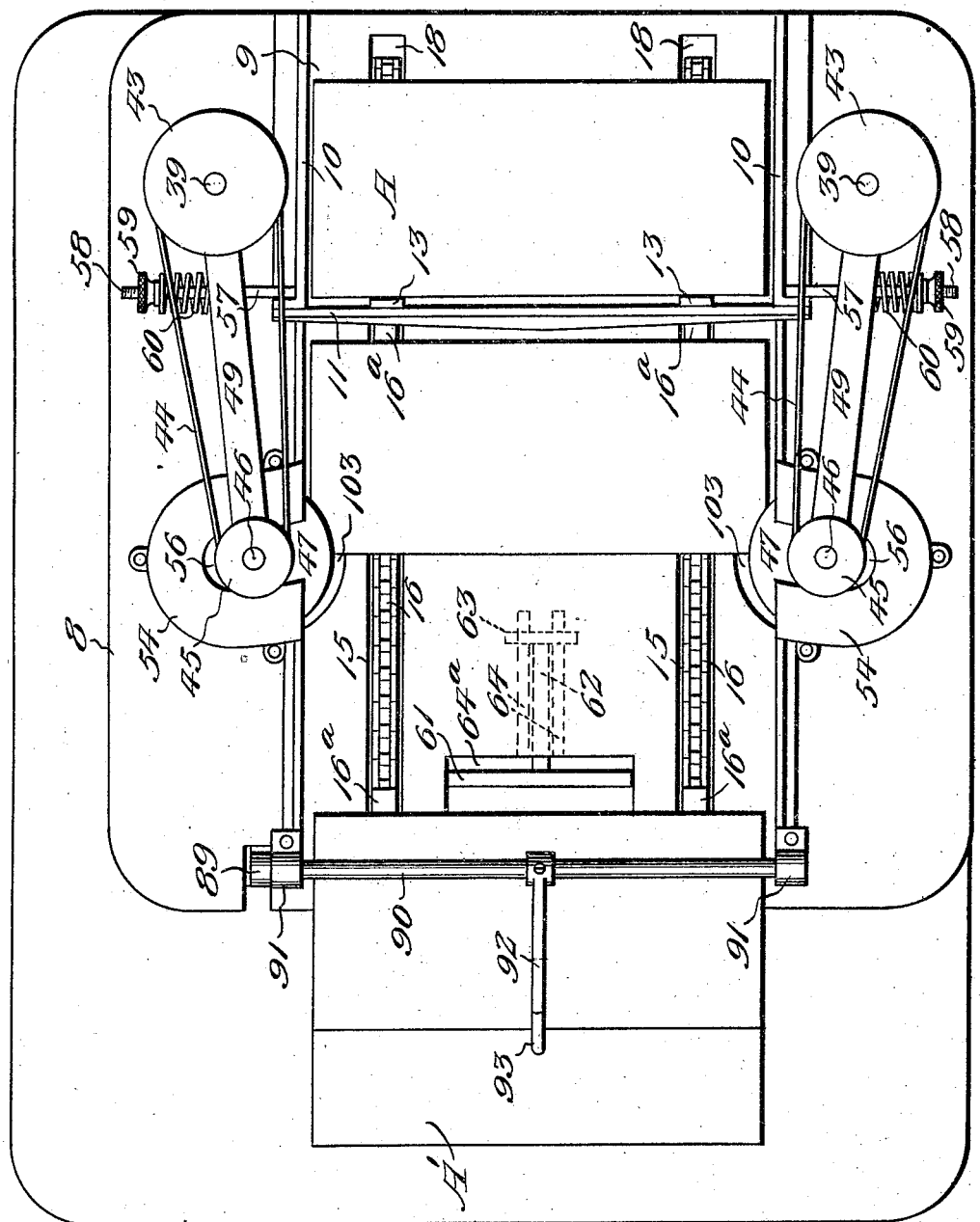
Figures 4, 5, 6:
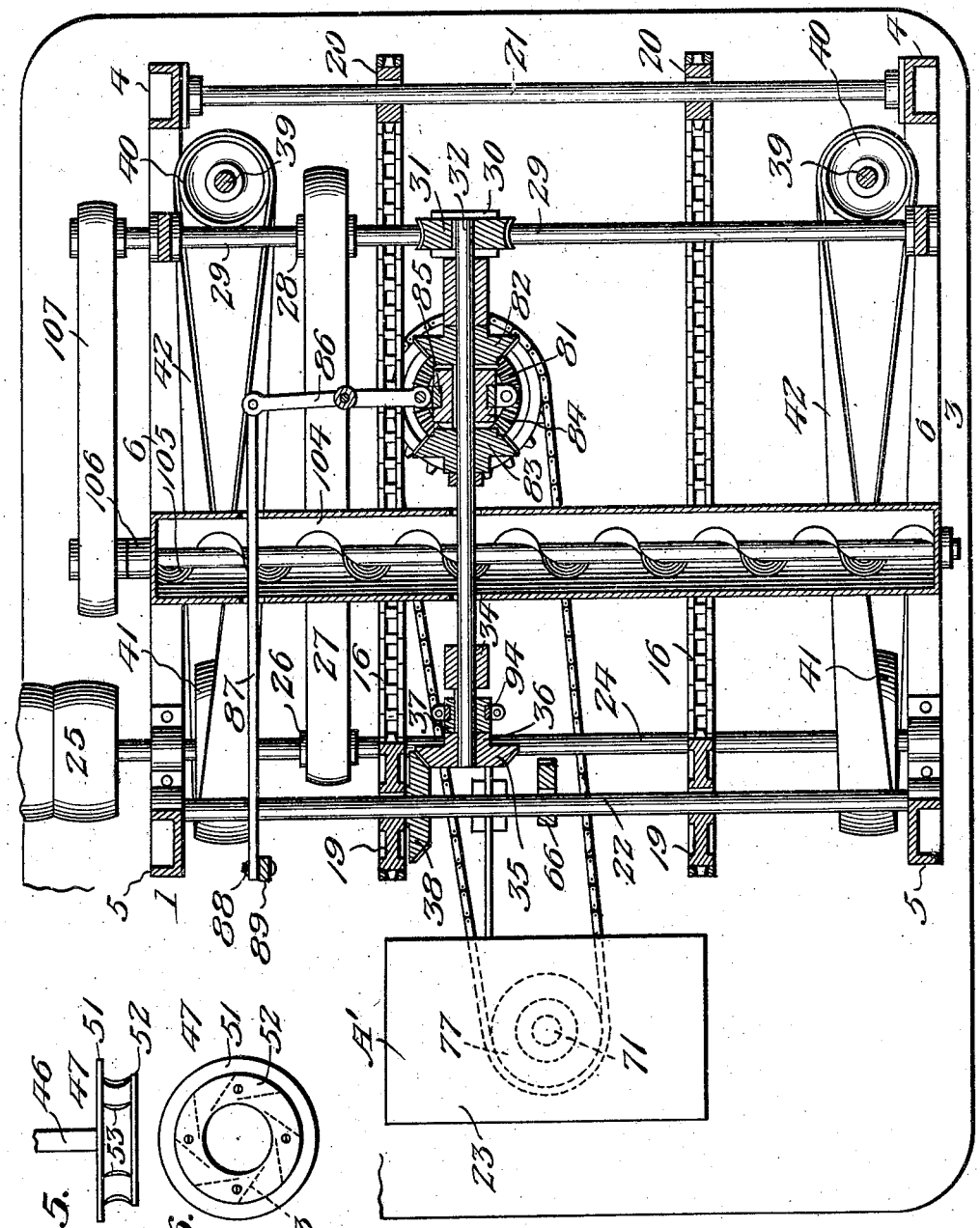

Figure 1 is a view in side elevation of a machine for trimming the edges of oil-cakes, constructed in accordance with my invention. Fig. 2 is a central vertical longitudinal section of the same. Fig. 3 is a top plan view. Fig. 4 is a horizontal section on the line 4 4 of Fig. 2. Fig. 5 is a side elevation of one of the rotary cutters for trimming the edges of the cakes. Fig. 6 is a bottom plan view of the same, and Fig. 7 is a detail vertical sectional view through the lower end of the feed-screw of the receiving-table, the nut for actuating the same, the associated sprocket-wheel, and the guide-sleeve and bearing.

Referring now more particularly to the drawings, wherein like characters designate corresponding parts throughout the several views, the numeral 1 denotes a frame which may be of any approved form and construction, but which, as shown in the present instance, comprises a base 2, side pieces 3, rising therefrom and each consisting of vertical end standards 4 and 5, connected by upper and lower longitudinal braces 6 and 7, and a horizontal platform or work-table 8, supported upon the upper ends of said side pieces. At the receiving end of the table a hopper or chamber 9 is provided to receive a pile of oil-cakes A, which are to be fed forward to be trimmed, the said hopper or chamber being open at its rear end to permit of the convenient insertion of the cakes therein and formed of side boards or pieces 10, connected at their upper forward edges by a cross-piece 11 and adjacent to their lower forward edges by a cross-piece 12. Vertical pieces 13 connect the said two cross-pieces 11 and 12 and form a stop and gage to hold all but the lowermost cake against forward movement, the lower ends of the said vertical pieces 13 terminating a suitable distance above the table to leave an intervening slot or passage 14 for the forward feed of the lowermost cake from the hopper. The table 8 is provided in its upper surface with spaced parallel longitudinal grooves or recesses 15, forming guides for the upper stretches or endless conveyer-chains 16 and to permit said chains to lie flush with the upper surface of the table. The chains run through vertical slots or openings 17 and 18, formed in the table at the opposite ends of the said grooves or recesses and below the table pass around sprocket-wheels 19 and 20, keyed upon transverse shafts 21 and 22, journaled in suitable bearings in the side pieces 3 at the receiving and delivery ends of the frame. The chains 16 operate in unison at a uniform rate of speed and form an endless conveyer to carry the cakes A one by one from the hopper or receiving-chamber 9 at the receiving end of the frame to a delivery-table 23 at the delivery end of the frame and for this purpose are provided at equidistant points with dogs or projections 16ª, which engage the rear edge of the lowermost cake and forces it forward through the opening 14 and thence along the surface of the table 8, the end edges of the cake being trimmed on its passage to the delivery-table by cutters or trimmers, hereinafter described.

Journaled in bearings at the delivery end of the frame is a transverse drive-shaft 24, provided at one end with one or more belt-pulleys 25, whereby it may be driven by a belt operated from any suitable source of power. On this shaft is a pulley 26, over which runs a belt 27, which transmits power therefrom through a pulley 28 to a transverse shaft 29, disposed near the receiving end of the frame. On the shaft 29 is a worm-pinion 30, which is in gear with a worm-wheel 31, mounted on one end of a longitudinal shaft 32, mounted in bearings 33 and 34, supported by the table 8. The opposite end of this shaft carries a loose beveled gear-wheel 35, which is provided with a clutch collar or sleeve 36, normally engaged by a clutch member 37, having a spline-and-groove connection with said shaft by which it is adapted to slide toward and from the sleeve 36 and to rotate at all times with said shaft. The clutch device 37 is retracted only at certain periods in the operation of the machine to release the gear-wheel 35 and arrest the movement of the endless conveyer to stop the feed of the oil-cakes when the delivery-table 23 has reached the limit of its downward movement, so that the said gear-wheel 35, which meshes with a beveled gear-wheel 38 on the transverse shaft 22, will normally communicate motion to said shaft, and therefore continuously operate the endless-chain conveyers 16.

Journaled in bearings on opposite sides of the frame, at the receiving end thereof, are vertical shafts 39, on which are pulleys 40, receiving motion from drive-pulleys 41 on the shaft 24 through the medium of quarter-twisted belts 42. The upper ends of these shafts 39 extend above the table 8 on the opposite sides of the hopper or receiving chamber 9 and are provided at their upper ends with pulleys 43, around which pass belts 44, which also pass around pulleys 45 on the upper ends of cutter-shafts 46, carrying at their lower ends cutter-heads 47, whereby the oil-cakes are trimmed on their passage from the hopper along the table. Each shaft 46 is journaled in a bearing-sleeve 48, carried by an arm 49, attached at one end to a bearing-sleeve 50, journaled on the upper end of the adjacent vertical shaft 39 below the pulley 43, the said sleeve 50 thus being coaxially mounted with the pulley 43, so as to turn or oscillate on the shaft 39 and permit the arm 49 to swing to adapt the cutter-head to have movement in an arc toward and from the center of the table. Each cutter-head 47 is rigidly mounted upon the lower end of its cutter-shaft 46 and is formed or provided with upper and lower projecting flanges 51 and 52, between which are disposed an annular series of cutting-blades 53, which are tangentially arranged to act with a chipping action upon the edges of the cakes A.

In the construction of machine herein shown two cutter-heads of the described structure are provided and arranged upon opposite sides of the path of travel of the oil-cakes along the work-table between the hopper and delivery-table, the cutter-heads being mounted within casings 54, suitably secured to the upper surface of the work-table to protect the same from injury, the top wall of each casing being provided with an arcuate slot 56 to receive the bearing-sleeve 48 and permit the same, with the cutter-head and its shaft 46, to swing or have movement in a direction laterally of the machine. Extending from each side of the hopper is a rod or bar 57, which extends through a slot or opening in the arm 49 and is threaded at its outer end, as indicated at 58, to receive an adjusting-nut 59. Surrounding the bar between this nut and the outer side of the arm 49 is a coiled spring 60, whose tension or pressure may be regulated by the said nut 59. This frame exerts its expansive pressure to normally force the arm 49 inwardly and to thereby bring the cutter-head carried thereby into the plane of movement of the adjacent end edge of the oil-cake A, so that the cutter-head in rapidly rotating will cut or chip off the soft marginal portion of the cake, which still contains a percentage of oil. The spring 60 in thus acting forces the cutter-head to its work and insures that the cutting-blades will remove all of the end of the cake exerting a certain resistance to removal. By this means the cutter-head will move inwardly under the pressure of the spring until in cutting its blades begin to act upon the hard portion of the body of the cake, when the resistance caused thereby will prevent the cutter from having further inward movement, thus providing automatically for the cutting away of that portion of the cake which still remains soft from the presence of oil. When the cutting-blades reach the limit of the soft marginal portion of the cake and come in contact with the hard body portion, the spring 60 permits them to yield against the resistance set up, so that they will automatically accommodate themselves to the depth or width of the soft marginal portion. This construction and mode of operation of the cutters, which, as shown, are arranged to trim the ends of the cake on the passage of the latter along the work-table, prevents waste by the cutting away of the hard bulk or body of the cake from which the oil has already been practically entirely expressed, while insuring the cutting away of those portions from which a percentage of oil may still be expressed.

As the cakes pass the cutters and are trimmed in the manner already described, their motion is continued by the action of the endless chains 16 until the cakes pass off the chains at the point above the slots 17 and are partially projected upon the delivery-table 23. As the movement imparted to the cake is not ordinarily sufficient to deliver it to the table 23 upon the passage of the chains downward through the slots 17 to engage the sprocket-wheels 19, an ejecting device is preferably used to force them successively upon the table and upon one another to form a pile A', as shown in Fig. 2. This ejector is automatically operated at proper periods in the operation of the machine and comprises an abutting member 61, having a rearwardly-projecting shank 62, connected at its rear end to a cross-head 63, (shown in dotted lines in Fig. 3,) which is pivotally and slidably mounted in guides 64, attached to the under side of the work-table 8 just in rear of a slot 64, formed in the table intermediate the slots 17. The shank 62 is provided on its under side with a series of rack-teeth 65, which are engaged periodically by a toothed segment 66, rigidly mounted upon and rotating with the forward transverse conveyer-shaft 22. Normally the abutting portion 61 of the ejector lies within the slot 64, with its upper surface substantially in the plane of the upper surface of the table 8 to avoid interfering with the feed of the oil-cakes; but after the trimmed cake has been forced beyond said slot in position to be delivered to the table 23 the segment 66 comes into engagement with the rack-teeth 65 and swings the ejector upward and at the same time slides it forward, thus bringing the abutting portion 61 into engagement with the cake and forcing the same onto the table 23 or onto the pile of cakes previously delivered thereon. When the segment in its course of movement passes the ejector, the latter will be retracted by a suitable retracting-spring 67 and will swing downward to its normal position above described in readiness to be operated at a subsequent period to eject the next succeeding cake.

As the trimmed oil-cakes are successively delivered to the table 23 it is obvious that some provision should be made for lowering said table as the cakes are successively piled thereon a distance equivalent to the thickness of each cake as it is forced thereon by the ejector, so as to always maintain a supporting-surface on which the ejected cake may slide in a plane coincident with or substantially coincident with the upper surface of the delivery end of the work-table. In order to provide for this exigency, the table 23 is rigidly mounted at its upper end upon a feed-screw 68, which is vertically movable in a guide-sleeve 69, fitted in the base 2, the said sleeve being provided with a spline or feather 70, which projects into a longitudinal groove 71, formed in the screw to hold said screw from rotation, while permitting it to have vertical movement. The sleeve 69 is formed with a flange or head 72, by which it may be secured to the base 2, and has a bearing-boss 73, on which turns an operating-nut 74, whose threads engage the threads of the screw, the said nut being provided on its under side with a bearing-seat 75, which engages anti-friction-bearings 76, turning in a groove or guideway formed on the boss 73. Keyed or otherwise suitably fixed to the nut is a sprocket wheel or rim 77, which is connected by a sprocket-chain 78 with a sprocket-wheel 79 on the lower end of a vertical shaft 80, which shaft 80 carries at its upper end a beveled gear-wheel 81, which is adapted to receive motion in one direction or the other from operating and reversing gears on the shaft 32, by which corresponding motion will be transmitted to the nut 74 to raise or lower the screw 71, and consequently the receiving-table 23.

The operating and reversing gears 82 and 83 are loosely mounted on the shaft 32 on opposite sides of a double clutch member 84, which is feathered upon said shaft to rotate therewith and slide in either direction thereon. When the clutch member is in engagement with the operating-gear 82, which is provided with a coacting clutch-ring, the shaft 80 will be rotated in the proper direction to cause the nut to move the screw 68 downward, while, on the other hand, when the clutch member is in engagement with a corresponding clutch-ring on the reversing-gear 83 the shaft 80 will be rotated in the opposite direction to cause the nut to reverse the operation of the feed-screw 68 or, in other words, to force it upward. The double clutch member 84 is formed with an annular groove to receive a ring 85, which is jointed to one end of an intermediately-pivoted lever 86, jointed at its opposite end to the inner end of a shipper-rod 87, connected at its outer end, as indicated at 88, (see Fig. 4,) to a crank-arm 69, depending from one end of a rock-shaft 90, journaled in suitable bearings 91 on the work-table and extending across the upper surface of said table at the delivery end thereof and beneath which the ejected cake passes on its way to the receiving-table 23. Attached to the center of this shaft 90 is a rocker-arm 92, which projects from the table 23 and is provided with a downturned trip-finger 93, which normally rests upon the table 23 or upon the uppermost cake of the pile A' resting thereon and is maintained thereby in a predetermined position, this position being such that the connections between the shaft and double clutch 84 are so arranged as to maintain said clutch in its neutral position in which it is not in mesh with either gear 82 or 83, so that the table 23 normally remains in the receiving position to which it has been preliminarily adjusted. When an oil-cake is, however, forced outwardly by the ejector 61, the cake will engage and lift the finger 93, thereby rocking the arm 92 in an upward direction and transmitting motion through the shaft 90 to draw upon the shipper-rod 87, thus swinging the lever 86 in the proper direction to shift the clutch device 84 into engagement with the gear 82, thereby causing said gear to be fixed to the shaft 32 and to transmit motion to the nut 74, which will operate to move the screw 68 downward. This downward motion of the screw, which will lower the table 23, will continue until said table is lowered a distance equivalent to the thickness of an oil-cake, when as the upper surface of the cake fed out upon said table comes flush with the upper surface of the work-table 8 the arm 92 will gravitate back to its normal position and in so doing will transmit reverse movement to the shipper-rod 87 to that previously described, and thereby restore the lever 86 to its normal position and move the clutch 84 to its normal position between the two gears 82 and 83, thus stopping the movement of the actuating-nut and feed-screw. This operation will periodically continue whenever a trimmed cake is deposited upon the table 23 or upon the pile of trimmed cakes resting thereon until said table 23 reaches the limit of its downward movement, when the further feed of trimmed cakes thereto will be arrested and the operation stopped until the pile of cakes resting on the table 23 is removed and the latter again adjusted to its uppermost receiving position, which is accomplished by mechanism which will now be described.

The clutch member 37 is formed with an annular groove in which is seated a ring 94, having a short arm or projection 95, which is pivotally connected to the upper end of a rocking link-lever 96, fulcrumed intermediate of its ends to a bracket-arm 97, depending from the bearing 34. The lower end of the lever 96 is also pivotally connected to the vertical arm 98 of a bell-crank lever 99, the horizontal arm 100 of which is pivoted to a bracket 101, suitably mounted upon the base 2 or some other part of the frame of the machine. The arm 100 projects outwardly a suitable distance beyond the delivery end of the machine to lie in the path of movement of the table 23 and is disposed adjacent to the nut 74, so as to be engaged by said table when the latter reaches the limit of its downward movement.

In the operation of the machine the feed-screw 68 is lowered by a step-by-step movement through the mechanism previously described as the cakes are successively piled thereon and upon reaching its lowermost position brings the table 23 into contact with the said arm 100. This arm operates in the nature of a trip device and when depressed by the table 23 rocks on its bearing 101, thus moving the arm 98 upward and transmitting motion to the link-lever 99, which turns on its bearing and shifts the clutch member 37 out of engagement with the clutch member on the beveled gear-wheel 35. The wheel 35 then turns loosely on the shaft 32 and ceases to transmit motion to the beveled gear-wheel 38, thus arresting the motion of the endless-conveyer chains and stopping the further feed of oil-cakes from the hopper 9. Upon the removal of the pile of trimmed cakes A' from the table 23 the finger 93 will be unsupported and the arm 92 will drop by gravity, thereby rocking the shaft 90 to the left in Fig. 2 and moving its crank-arm 89 rearwardly, thus transmitting rearward motion to the rod 87, which will swing the lever 86 so as to move the clutch 84 from its neutral position into mesh with the clutch portion of the beveled gear-wheel 83, whereupon the motion of the shaft 32 will be transmitted to the shaft 8 to continuously rotate the nut 74 through the intermediate connections and raise the feed-screw 68 until the table 23 is elevated to its normal height, at which time said table will engage the finger 93 and restore it to its normal position, causing the shaft 9 to be rocked in the opposite direction and to correspondingly actuate the lever 86 to restore the clutch member to its neutral position, thereby disengaging it from gear-wheel 83 and arresting the operation of the nut 74. The upward movement of the table 23 releases the trip-arm 100, permitting the bell-crank lever 99 to return by gravity to its normal position, whereby the clutch 37 will again be shifted into engagement with the gear 35 and throw the conveyer-chains again into operation, thus reëstablishing normal conditions to cause the oil-cakes to be again fed forward from the hopper 9. The trimmings or soft marginal portions of the cakes removed by the cutters discharge through eduction-openings 103, formed in the work-table 8, into a trough or receptacle 104, disposed transversely beneath said work-table, in which trough operates a screw conveyer 105, the ends of the shaft of which are journaled in suitable bearings 106 on the ends of the frames or the ends of the trough 104. One end of the shaft of the conveyer is provided with a pulley or belt-wheel which is connected with a pulley or belt-wheel on the rear conveyer-shaft 29 by a belt 107, whereby the screw conveyer is driven continuously in the operation of the machine. The screw conveyer works the cuttings or trimmings toward one end of the trough 104, where they discharge through an outlet 108 into a suitable receptacle, from which they may be removed for subsequent compression to extract the oil contained therein.

From the foregoing description, taken in connection with the accompanying drawings, the construction and mode of operation of the apparatus will be readily understood, and it will be seen that a machine is provided which will remove the soft marginal portions of oil-cakes with a minimum of waste and which is entirely automatic in operation from the time the cakes to be trimmed are deposited in the hopper 9 and until the trimmed cakes are removed from the delivery-table 23. This automatic operation of the machine and the peculiar construction and mode of operation of the cutting and trimming devices enables the work of trimming the cakes to be speedily, conveniently, and cheaply performed, so that the large percentage of unexpressed oil remaining in the cakes may be recovered by subsequent compression of the trimmings, resulting in the recovery of a large proportion of oil ordinarily allowed to go to waste.

Changes in the form, proportions, and minor details of construction may be made within the scope of the invention without departing from the spirit or sacrificing any of the advantages thereof.

Having thus described the invention, what is claimed as new, is—

1. In a machine of the character described, a trimming device comprising a driving-shaft, a swinging arm movable on an arc concentric with said shaft, a cutter-shaft carried by said arm, a rotary cutter carried by said cutter-shaft, an adjustable resistance-spring acting on said arm, and a driving connection between said shafts.

2. In a machine of the character described, the combination of a table, a feeder for feeding the cakes along the table, cutters for trimming the cakes fed by the feeder, a receiver for the trimmed cakes, said receiver having an intermittent movement to adjust it to successively receive the cakes, drive-gearing for operating the several parts, clutch mechanism associated with said gearing, and automatic means controlling the clutch mechanism, whereby in the operation of the machine the motion of the feeder and receiver will be arrested when the latter has received the maximum number of cakes, the receiver restored to normal position, and the feeder again thrown into operation.

3. In a machine of the character described, the combination with trimming means adapted to remove the soft marginal portions of oil-cakes, means for feeding the cakes past the trimming means, a support to receive the trimmed cakes, and periodically-operating means for discharging the cakes onto said support.

4. In a machine of the character described, the combination of trimming means to remove the soft marginal portions of oil-cakes, means for supporting the cakes, means for producing a relative movement of said parts to adapt the trimming means to operate along the edges of the cakes, a receiver for the cakes, a removable screw-support for the receiver, a nut for operating said support to change the position of the receiver periodically as the cakes are fed thereto, and means for operating the nut.

5. In a machine of the character described, the combination of trimming means, means for feeding the cakes to be trimmed, a receiver for the trimmed cakes, periodically-operated means governing the position of said receiver to successively bring it into position to receive the cakes, and means for arresting the action of said operating means and the cake-feeding means when the receiver reaches the limit of its feeding movement, and means for restoring the feeder to its normal position and resetting the parts for further operation.

6. In a machine of the character described, the combination of trimming means, means for feeding the cakes to be trimmed, a receiver, means for periodically ejecting the trimmed cakes to the receiver, and means for imparting an intermittent motion to the receiver to adapt it to receive a pile or series of cakes.

7. In a machine of the character described, the combination of trimming means, means for feeding oil-cakes to be trimmed, a receiver for the trimmed cakes, and means for periodically ejecting the cakes to the receiver.

8. In a machine of the character described, the combination of trimming means, feeding means for oil-cakes, a receiver, means for communicating motion to said feeding means, and means operated thereby at predetermined times for ejecting the trimmed cakes to the receiver.

9. In a machine of the character described, the combination of trimming means, means for feeding the oil-cakes to be trimmed, a receiver for the trimmed cakes, a reciprocating device for ejecting the trimmed cakes to the receiver, and means for operating said reciprocating device.

10. In a machine of the character described, trimming means, means for feeding the cakes to be trimmed, a receiver for the trimmed cakes, a motive element for operating said feeder, a toothed reciprocating ejector for feeding the trimmed cakes to the receiver, and a toothed member on the motive element adapted to periodically operate said ejector.

11. In a machine of the character described, the combination of trimming means, cake-feeding means, a receiver for the trimmed cake, gearing for continuously operating the feeder and intermittently adjusting the receiver, and means controlling said gearing for permitting intermittent movement of the receiver without affecting the feeder and for arresting the movement of said feeder when a prescribed number of trimmed cakes have been fed to the receiver.

12. In a machine of the character described, the combination of trimming means, means for feeding the cakes to be trimmed, a periodically-adjusted receiver for the cakes, gearing for adjusting said receiver, gearing for operating the feeder, and means for controlling the action of the gearing operating the receiver to intermittently adjust said receiver to successively receive the trimmed cakes and to reverse the receiver to restore it to its normal position after the same has reached the limit of its feeding movement and been relieved of the load of trimmed cakes.

13. In a machine of the character described, the combination of trimming means, means for feeding the cakes to be trimmed, operating mechanism for said feeding means, an intermittently-adjustable receiver for the trimmed cakes, operating mechanism for said receiver, means for normally controlling the operating mechanism of the receiver to intermittently adjust it away from the path of movement of the delivered trimmed cakes to adapt it to successively receive the cakes, and means controlling said operating means and the operating means of the feeder for arresting the operation of the latter when the receiver has received a maximum number of cakes, for reversing said receiver and restoring it to its normal position, and for again throwing the feeder into operation.

14. In a machine of the character described, the combination of trimming means, means for feeding the cakes to be trimmed, said means including a feeding device, and a shaft for imparting motion thereto, a receiver for the trimmed cakes having an intermittent movement, gearing for intermittently operating the receiver, a controller regulated by the action of said shaft to intermittently operate and reverse the receiver, an element adapted to be engaged by the receiver and the cakes fed thereto, and means actuated by said element to govern the movement of said controller.

15. In a machine of the character described, the combination of trimming means, cake-feeding means, a receiver for the trimmed cakes, a continuously-operating shaft, gearing between said shaft and feeder for normally operating the feeder, normally inactive gearing for intermittently adjusting the receiver, means for throwing the gearing for operating the feeder out of action, means for periodically throwing the gearing for adjusting the receiver to intermittently move it on its feeding movement and continuously move it for restoration to its normal position, a device automatically operated by the receiver on reaching the limit of its return movement and upon the feed of the cakes thereto to control the said means governing the operation of the means for operating the receiver, and a device operative when the receiver reaches the limit of its feeding movement to arrest the operation of the feeder.

16. In a machine of the character described, the combination of trimming means, means for supporting the cakes to be trimmed, means for producing a relative movement of said parts to cause the trimming means to remove the soft marginal portions of the cakes, a receiver for the trimmed cakes, a conveyer to carry away the trimmings, and means for automatically operating the parts to effect the trimming operation, to intermittently operate the receiver, to stop the feeding of the cakes when the receiver is filled, and to return the receiver to its normal position and reset the parts for further operation.

17. In a machine of the character described, the combination of trimming means, means for feeding oil-cakes, a receiver, means for intermittently adjusting the receiver to successively receive the trimmed cakes, means for periodically ejecting the trimmed cakes to the receiver, means for operating the feeder, and means for automatically and intermittently adjusting the receiver, stopping the feeder when the receiver is filled and returning the receiver to its normal position when the trimmed cakes are removed therefrom and restarting the feeder, substantially as described.

In testimony whereof I affix my signature in presence of two witnesses.

CHARLIE FRANK YOUNG.

Witnesses:
T. J. KOOGLER,
C. H. BESOM.